(12) United States Patent
Kikuchi et al.

(10) Patent No.: US 9,089,023 B2
(45) Date of Patent: Jul. 21, 2015

(54) DRIVING CIRCUIT OF LIGHT EMITTING ELEMENT, AND LIGHT EMITTING DEVICE AND ELECTRONIC APPARATUS INCLUDING THE LIGHT EMITTING ELEMENT

(71) Applicant: ROHM CO., LTD., Kyoto (JP)

(72) Inventors: Hiroki Kikuchi, Kyoto (JP); Junichi Hagino, Kyoto (JP)

(73) Assignee: ROHM CO., LTD. (JP)

( * ) Notice: Subject to any disclaimer, the term of this patent is extended or adjusted under 35 U.S.C. 154(b) by 0 days.

(21) Appl. No.: 14/279,541

(22) Filed: May 16, 2014

(65) Prior Publication Data

US 2014/0340615 A1    Nov. 20, 2014

(30) Foreign Application Priority Data

May 17, 2013    (JP) .................................. 2013-105447

(51) Int. Cl.
*H05B 37/02*    (2006.01)
*H05B 33/08*    (2006.01)
*G02F 1/1335*    (2006.01)

(52) U.S. Cl.
CPC ...... *H05B 33/0815* (2013.01); *G02F 1/133603* (2013.01); *Y02B 20/341* (2013.01); *Y02B 20/345* (2013.01)

(58) Field of Classification Search
None
See application file for complete search history.

(56) References Cited

U.S. PATENT DOCUMENTS

| 6,043,609 | A  | * | 3/2000 | George et al. ............... 315/169.3 |
| 8,049,438 | B2 | * | 11/2011 | Liu et al. ......................... 315/297 |
| 2010/0039048 | A1 | * | 2/2010 | Liu et al. ......................... 315/307 |
| 2010/0123400 | A1 | * | 5/2010 | Jin et al. .......................... 315/127 |
| 2010/0308738 | A1 | * | 12/2010 | Shteynberg et al. ....... 315/185 R |
| 2010/0308739 | A1 | * | 12/2010 | Shteynberg et al. .......... 315/193 |
| 2011/0227489 | A1 | * | 9/2011 | Huynh ...................... 315/185 R |
| 2012/0081009 | A1 | * | 4/2012 | Shteynberg et al. .......... 315/122 |
| 2012/0176037 | A1 | * | 7/2012 | Lee ................................ 315/122 |
| 2012/0313529 | A1 | * | 12/2012 | Chen et al. ..................... 315/121 |

FOREIGN PATENT DOCUMENTS

| JP | 2006-114324 A | 4/2006 |
| JP | 2006-339298 A | 12/2006 |
| JP | 2007-158083 A | 6/2007 |
| JP | 2008-64477 A | 3/2008 |
| JP | 2008-258428 A | 10/2008 |
| JP | 2008-300208 A | 12/2008 |

* cited by examiner

*Primary Examiner* — Crystal L Hammond
(74) *Attorney, Agent, or Firm* — Cantor Colburn LLP

(57) ABSTRACT

A driving circuit for a light emitting element is disclosed. The driving circuit includes a DC-DC converter configured to generate a drive voltage between a first line and a second line; a current driver, configured to be connected to the light emitting element in series between the first line and the second line, configured to supply a drive current to the light emitting element; a protection resistor configured to be connected to the light emitting element in series between the first line and the current driver; and a controller configured to control the DC-DC converter such that a first detection voltage, which corresponds to a voltage between both ends of the current driver, approaches a predetermined reference voltage and perform a predetermined protection process if the drive voltage between the first line and the second line exceeds a predetermined first threshold voltage.

13 Claims, 8 Drawing Sheets

DRIVING CIRCUIT OF LIGHT EMITTING ELEMENT, AND LIGHT EMITTING DEVICE AND ELECTRONIC APPARATUS INCLUDING THE LIGHT EMITTING ELEMENT

CROSS-REFERENCE TO RELATED APPLICATION

This application is based upon and claims the benefit of priority from Japanese Patent Application No. 2013-105447, filed on May 17, 2013, the entire contents of which are incorporated herein by reference.

TECHNICAL FIELD

The present disclosure relates to techniques for driving a light emitting element.

BACKGROUND

In recent years, fluorescent tubes used as lighting devices or backlight units for liquid crystal display (LCD) panels have been replaced with other types of light emitting elements such as light emitting diodes (LEDs), which have improved properties in energy saving, life span, control, and the like.

FIG. 1 is a circuit diagram illustrating a configuration example of a conventional light emitting device. A light emitting device 1r includes a plurality of LED strings 4_1 to 4_N (which may also be referred to as "LED bars") of multiple N channels CH_1 to CH_N, and a driving circuit 2r.

Each LED string 4 includes a plurality of LEDs which are connected to each other in series. The driving circuit 2r includes a DC-DC converter 10, a plurality of current drivers 20_1 to 20_N, and a controller 30. For example, the current drivers 20_1 to 20_N and the controller 30 may be integrated into a single IC (Integrated Circuit) chip or module.

The DC-DC converter 10 supplies a drive voltage $V_{OUT}$ to anodes of the LED strings 4_1 to 4_N by boosting an input voltage $V_{IN}$. The DC-DC converter 10 is a step-up switch power supply that includes a switch transistor M1, an inductor L1, a rectifier diode D1, and an output capacitor C1.

The current drivers 20_1 to 20_N are configured in the channels CH_1 to CH_N, respectively, and given i (1≤i≤N), the current driver 20_i is connected to a cathode of the corresponding LED string 4_i. The current driver 20_i is, thus, configured to supply a drive current $I_{LED\_i}$ to the corresponding LED string 4_i.

The controller 30 controls the DC-DC converter 10. Specifically, the controller 30 performs a switch operation on the switch transistor M1 in the DC-DC converter 10 so as to adjust a lowest voltage from among cathode voltages $V_{LED\_1}$ to $V_{LED\_N}$ of the LED strings 4_1 to 4_N in the channels CH_1 to CH_N to be equal to a predetermined reference voltage $V_{REF}$. The reference voltage $V_{REF}$ is set as a voltage level at which the drive current $I_{LED}$ can be generated without saturating an internal transistor of the current driver 20.

For example, the controller 30 may include an error amplifier 32, a pulse modulator 34, a driver 36, an OVP (Over-Voltage Protection) comparator 38, and a logic part 40.

The error amplifier 32 generates an error voltage $V_{FB}$ by amplifying an error (e.g., a gap in voltage) between the reference voltage $V_{REF}$ and the lowest voltage from among the cathode voltages $V_{LED\_1}$ to $V_{LED\_N}$ in the channels CH_1 to CH_N. The pulse modulator 34 generates a pulse signal $S_{PM}$ that has a duty cycle according to the error voltage $V_{FB}$. For example, the pulse modulator 34 adjusts the duty cycle of the pulse signal $S_{PM}$ by performing pulse width modulation or pulse frequency modulation.

Based on the pulse signal $S_{PM}$, the driver 36 performs a switch operation on the switch transistor M1 of the DC-DC converter 10. For example, it may be assumed that a voltage drop $V_{F\_i}$ across an LED string 4_i in an i-th one of the channels CH_1 to CH_N is the largest. Then, the cathode voltage $V_{LED\_i}$ of the LED string 4_i in the i-th channel is lowest and a feedback is applied to adjust the cathode voltage $V_{LED\_i}$ to be equal to the reference voltage $V_{REF}$. Accordingly, the drive voltage $V_{OUT}$ is stabilized to a target level according to following Equation (1):

$$V_{OUT}=V_{F\_i}+V_{REF} \quad \text{Equation (1)}$$

A pair of resistors R11 and R12 divides the drive voltage $V_{OUT}$. The OVP comparator 38 compares the divided drive voltage $V_{OUT}'$ with a predetermined threshold voltage $V_{OVP2}$, and asserts an OVP signal (for example, generates a high level signal) when $V_{OUT}' > V_{OVP2}$. When the OVP signal is asserted, the logic part 40 is configured to perform a predetermined over-voltage protection process. For example, when the OVP signal is asserted, the logic part 40 may stop the current drivers 20_1 to 20_N and the switch operation of the DC-DC converter 10.

The configurations of the driving circuit 2r are described in the above. The driving circuit 2r is capable of stabilizing the drive voltage $V_{OUT}$ to a lowest level within a range where the LED string 4 of each channel can be illuminated with desired brightness. As such, it is possible to drive the LED strings 4_1 to 4_N with high efficiency.

In addition, as the OVP comparator 38 detects an overvoltage, it is possible to prevent the drive voltage $V_{OUT}$ from exceeding a threshold voltage $V_{OVP1}$ ($=V_{OVP2}\times(R11+R12)/R12$) and protect the DC-DC converter 10, the LED strings 4, and various other components in the current driver 20 against the overvoltage.

However, the light emitting device 1r of FIG. 1 may involve the following problems.

If the light emitting device 1r is not completely sealed, foreign substances such as fine dusts and metal pieces may be introduced into the light emitting device 1r. Due to such foreign substances, any nodes may be short-circuited to a voltage potential of ground (which may be referred to as "ground fault") or short-circuited to a voltage potential of a power supply (which may be referred to as "power source fault"). Such a ground fault or a power source fault may make a feedback control ineffective and cause a problem in which circuit elements may be heated by a large current flowing through any path.

For example, it may be assumed that an LED terminal LED_N in an N-th channel is in a state of a ground-fault due to a path 6, which is indicated by dashed lines having dots. FIG. 2 illustrates diagrams of operation waveforms of the light emitting device 1r illustrated in FIG. 1 under a state of a ground fault.

Before time $t_0$, the light emitting device 1r is in a normal state, a cathode voltage (i.e., first detection voltage) $V_{LED\_N}$ of the LED string 4_N in the N-th channel is stabilized to the reference voltage $V_{REF}$, and a drive current $I_{LED\_NORM}$ flows through the LED string 4_N. The drive voltage $V_{OUT}$ is stabilized to a voltage level according to the following Equation (2):

$$V_{OUT\_NORM}=V_{F\_NORM}+V_{REF} \quad \text{Equation (2)}$$

In Equation (2), $V_{F\_NORM}$ indicates a forward voltage (i.e., a voltage drop) of the LED string 4_N when the drive current $I_{LED\_NORM}$ flows.

If a ground fault occurs due to the path 6 at time $t_0$, the cathode voltage $V_{LED\_N}$ decreases to near 0V. The controller 30 then increases the drive voltage $V_{OUT}$ in order to increase the cathode voltage $V_{LED\_N}$ to the reference voltage $V_{REF}$. However, since the cathode voltage $V_{LED\_N}$ is not increased in spite of increasing the drive voltage $V_{OUT}$, a feedback is applied to further increase the drive voltage $V_{OUT}$.

In this case, since the drive voltage $V_{OUT}$ is directly applied between an anode and a cathode of the LED string 4_N in the N-th channel, the drive current $I_{LED\_N}$ cannot be controlled, which results in increasing the drive current $I_{LED\_N}$. This state lasts until time $t_1$ at which the drive voltage $V_{OUT}$ reaches the OVP threshold voltage $V_{OVP1}$. After time $t_1$, as the OVP is activated, the drive voltage $V_{OUT}$ begins to decrease and thus the drive current $I_{LED\_N}$ decreases.

As such, in the light emitting device 1r of FIG. 1, the flow of a large current through the LED string 4_N is continued between times $t_0$ and $t_1$.

SUMMARY

The present disclosure provides various embodiments of a driving circuit equipped with an overcurrent protection function.

According to one embodiment of the present disclosure, there is provided a driving circuit for a light emitting element, including: a DC-DC converter configured to generate a drive voltage $V_{OUT}$ between a first line and a second line; a current driver, configured to be connected to the light emitting element in series between the first line and the second line, configured to supply a drive current to the light emitting element; a protection resistor R1 configured to be connected to the light emitting element in series between the first line and the current driver; and a controller configured to control the DC-DC converter such that a first detection voltage, which corresponds to a voltage between both ends of the current driver, approaches a predetermined reference voltage, and perform a predetermined protection process if the drive voltage $V_{OUT}$ between the first line and the second line exceeds a predetermined first threshold voltage $V_{OCP1}$.

According to this embodiment, in an overvoltage state, as the drive voltage $V_{OUT}$ exceeds the first threshold voltage $V_{OCP1}$, a protection circuit operation is activated. In addition, even in an overcurrent state, since a voltage drop $I_{LED\_OCP} \times$ R1 across the protection resistor R1 increases, the drive voltage $V_{OUT}$ between the first line and the second line increases. As a result, as the drive voltage $V_{OUT}$ exceeds the first threshold voltage $V_{OCP1}$, the protection circuit is operated.

In a normal state, when it is assumed that a drive current flowing through the light emitting element is $I_{LED\_NORM}$, a voltage drop across the light emitting element is $V_{F\_NORM}$, and the reference voltage is $V_{REF}$, a drive voltage $V_{OUT\_NORM}$ is given by following Equation (3):

$$V_{OUT\_NORM} = I_{LED\_NORM} \times R1 + V_{F\_NORM} + V_{REF} \qquad \text{Equation (3)}$$

On the other hand, in an overcurrent state, when it is assumed that a current flowing through the light emitting element is $I_{LED\_OCP}$, a voltage drop across the light emitting element is $V_{F\_OCP}$, and a resistance is provided by the protection resistor R1. A drive voltage $V_{OUT\_OCP}$ is given by following Equation (4):

$$V_{OUT\_OCP} = I_{LED\_OCP} \times R1 + V_{F\_OCP} \qquad \text{Equation (4)}$$

In this case, it may be stated that the first threshold voltage $V_{OCP1}$ satisfies following Condition (5):

$$V_{OUT\_NORM} < V_{OCP1} < V_{OUT\_OCP} \qquad \text{Condition (5)}$$

In one embodiment, the driving circuit may further include a voltage divider configured to generate a second detection voltage by dividing the drive voltage $V_{OUT}$. In this embodiment, the controller may include an error amplifier configured to generate an error signal by amplifying an error between the first detection voltage and the reference voltage; a pulse modulator configured to generate a pulse signal having a duty cycle associated with the error signal; a driver configured to perform a switch operation on a switch element of the DC-DC converter based on the pulse signal; a comparator configured to compare the second detection voltage with a second threshold voltage and assert a protection signal if the second detection voltage is higher than the second threshold voltage; and a logic part configured to perform the predetermined protection process if the protection signal is asserted. The second threshold voltage is determined based on the first threshold voltage.

In one embodiment, the light emitting element and the current driver may be provided in each of a plurality of channels. In this embodiment, the controller may control the DC-DC converter such that a lowest one of the first detection voltages in the plurality of channels approaches the reference voltage.

In one embodiment, the light emitting element may be a light emitting diode string including a plurality of light emitting diodes connected in series.

In one embodiment, the current driver and the controller may be integrated into a single semiconductor substrate. It will be appreciated that the term "integrated" includes both of a case where all elements of a circuit are formed on a semiconductor substrate and a case where main elements of the circuit are integrated on the semiconductor substrate. In addition, some resistors, capacitors, and the like for adjustment of circuit constants may be provided outside the semiconductor substrate.

In one embodiment, a light emitting device may include a light emitting element and the above driving circuit. In this embodiment, the driving circuit drives the light emitting element.

In one embodiment, an electronic apparatus may include a liquid crystal display panel and the above light emitting device. In this embodiment, the light emitting device is provided as a backlight unit for the liquid crystal panel.

According to another embodiment of the present disclosure, there is provided a driving circuit for a light emitting element, including a DC-DC converter configured to generate a drive voltage $V_{OUT}$ between a first line and a second line; a detection resistor configured to be connected to the light emitting element in series between the first line and the second line; a protection resistor R3 configured to be connected to the light emitting element in series between the first line and the detection resistor; and a controller configured to control the DC-DC converter such that a third detection voltage, which corresponds to a voltage between both ends of the detection resistor, approaches a dimming voltage indicative of a brightness of the light emitting element, and perform a predetermined protection process if the drive voltage $V_{OUT}$ between the first line and the second line exceeds a predetermined first threshold voltage $V_{OCP1}$.

In this embodiment, in an overvoltage state, as the drive voltage $V_{OUT}$ exceeds the first threshold voltage $V_{OCP1}$, a protection circuit operation is activated. In addition, even in an overcurrent state, since a voltage drop $I_{LED\_OCP} \times$ R3 across the protection resistor R3 increases, the drive voltage $V_{OUT}$ between the first line and the second line increases by the voltage drop. As a result, as the drive voltage $V_{OUT}$ exceeds the first threshold voltage $V_{OCP1}$, the protection circuit is be operated.

In a normal state, when it is assumed that the dimming voltage is $V_{ADIM}$ and a resistance of the protection resistor is R2, a drive current $I_{LED\_NORM}$ is given by following Equation (6):

$$I_{LED\_NORM} = V_{ADIM}/R2 \qquad \text{Equation (6)}$$

In this case, when it is assumed that the voltage drop across the light emitting element is $V_{F\_NORM}$, the drive voltage $V_{OUT\_NORM}$ is given by following Equation (7):

$$V_{OUT\_NORM} = V_{F\_NORM} + R3 \times I_{LED\_NORM} + V_{ADIM} \qquad \text{Equation (7)}$$

On the other hand, in an overcurrent state, when it is assumed that a current flowing through the light emitting element is $I_{LED\_OCP}$ and a voltage drop across the light emitting element is $V_{F\_OCP}$, a drive voltage $V_{OUT\_OCP}$ is given by following Equation (8):

$$V_{OUT\_OCP} = V_{F\_OCP} + (R2+R3) \times I_{LED\_OCP}$$

In this case, it may be stated that the first threshold voltage $V_{OCP1}$ satisfies following Condition (9):

$$V_{OUT\_NORM} < V_{OCP1} < V_{OUT\_OCP} \qquad \text{Condition (9)}$$

In one embodiment, the driving circuit may further include a voltage divider configured to generate a fourth detection voltage by dividing the drive voltage. In this embodiment, the controller may include an error amplifier configured to generate an error signal by amplifying an error between the third detection voltage and the dimming voltage; a pulse modulator configured to generate a pulse signal having a duty cycle associated with the error signal; a driver configured to perform a switch operation on a switch element of the DC-DC converter based on the pulse signal; a comparator configured to compare the fourth detection voltage with a second threshold voltage and assert a protection signal if the fourth detection voltage is higher than the second threshold voltage; and a logic part configured to perform the predetermined protection process when the protection signal is asserted. The second threshold voltage is determined based on the first threshold voltage.

In one embodiment, the light emitting element may be a light emitting diode string including a plurality of light emitting diodes connected in series.

In one embodiment, the current driver and the controller may be integrated into a single semiconductor substrate.

In one embodiment, a light emitting device may include a light emitting element and the above driving circuit. In this embodiment, the driving circuit drives the light emitting element.

In one embodiment, an electronic apparatus may include a liquid crystal display panel and the above light emitting device. In this embodiment, the light emitting device is provided as a backlight unit for the liquid crystal panel.

Other aspects of the present disclosure may include any combinations of the above-described elements or conversion of expression of the present disclosure between methods, apparatuses and so on.

DETAILED DESCRIPTION

Figure 1:
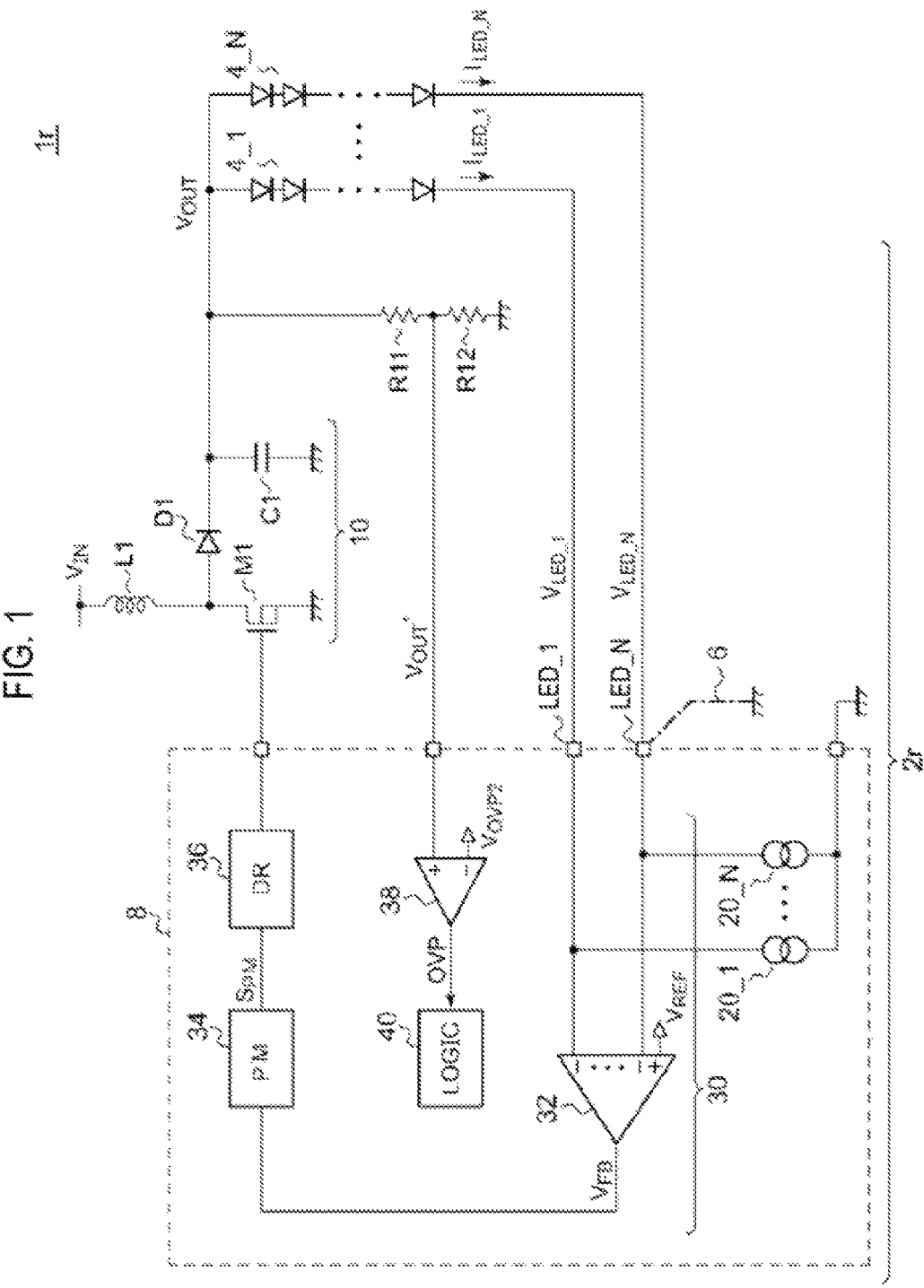
FIG. 1 is a circuit diagram illustrating a configuration of a conventional light emitting device.

Various embodiments of the present disclosure will now be described in detail with reference to the drawings. Throughout the drawings, the same or similar elements, members and processes are denoted by the same reference numerals, explanations of which will not be repeated. The disclosed embodiments are provided for the purpose of illustration, not limitation, of the present disclosure.

As used herein, the phrase "a state where a member A is connected with a member B" may include a case where the member A is physically and directly connected with the member B, and a case where the member A is connected with the member B via another member which has no substantial effect on a state of electrical connection of the members A and B or has no damage to functions and effects achieved by combination of the members A and B.

Similarly, the phrase "a state where a member C is interposed between a member A and a member B" may include a case where the member A is directly connected with the member C or the member B is directly connected with the member C, and a case where the members are indirectly connected via another member.

First Embodiment

Figure 3:
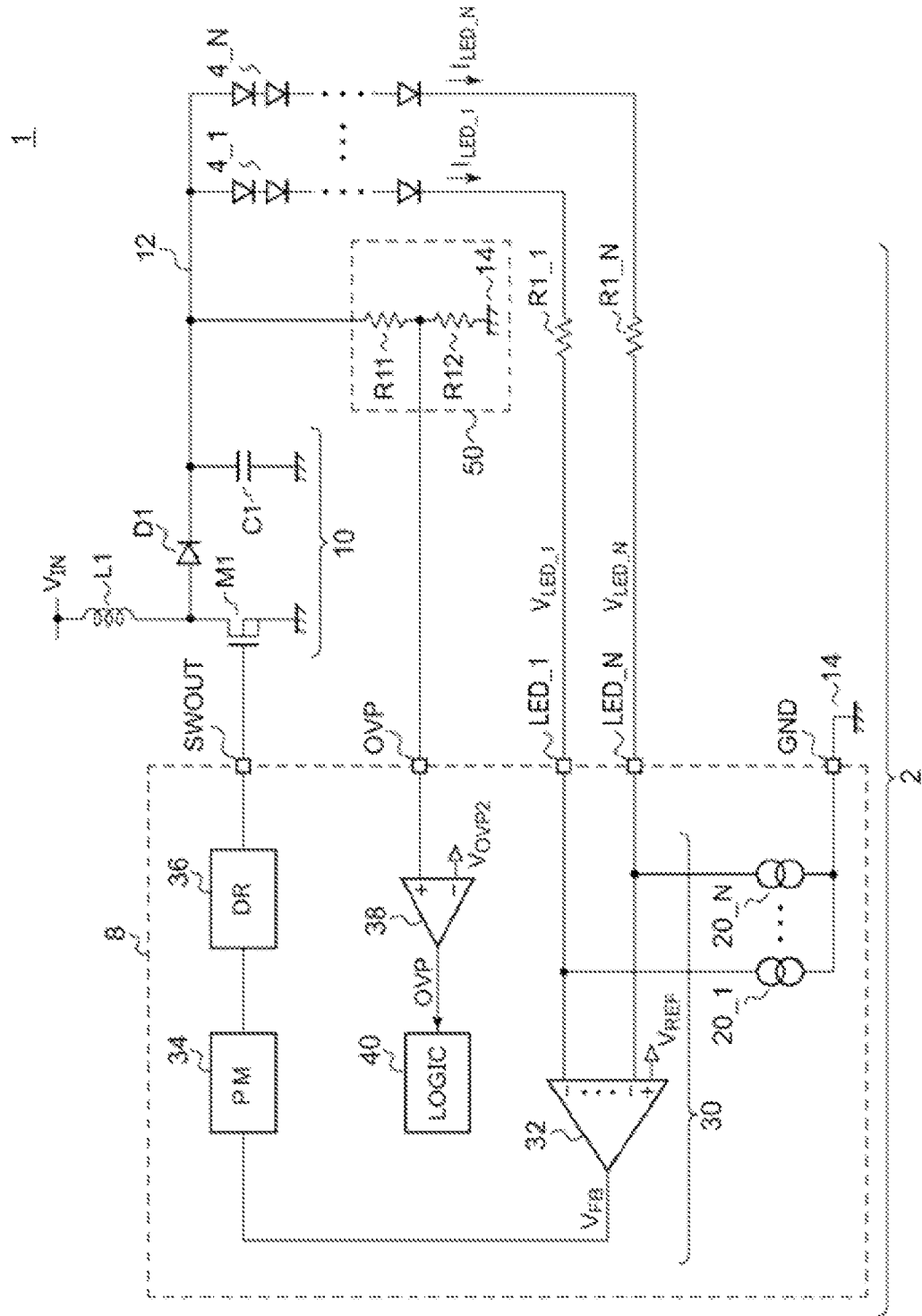
FIG. 3 is a circuit diagram illustrating a light emitting device according to a first embodiment of the present disclosure.

FIG. 3 is a circuit diagram illustrating a light emitting device 1 according to a first embodiment of the present disclosure. Similar to the light emitting device 1r of FIG. 1, the light emitting device 1 includes a plurality of LED strings 4_1 to 4_N of multiple N channels CH_1 to CH_N, and a driving circuit 2.

The driving circuit 2 includes a DC-DC converter 10, a plurality of current drivers 20_1 to 20_N, a controller 30, a voltage divider 50, and a plurality of protection resistors R1_1 to R1_N which are provided in the channels CH_1 to CH_N, respectively. For example, the current drivers 20_1 to 20_N and the controller 30 may be integrated into a single IC chip or module (hereinafter, referred to as a control IC 8).

The DC-DC converter 10 supplies a drive voltage $V_{OUT}$ to anodes of the LED strings 4_1 to 4_N by boosting an input voltage $V_{IN}$. The DC-DC converter 10 is a step-up switch power supply that includes a switch transistor M1, an inductor L1, a rectifier diode D1, and an output capacitor C1. Since a general topology of the DC-DC converter 10 may be used, specific explanations are omitted. A person skilled in the art can understand that the topology of the DC-DC converter 10 may be implemented in the illustrated manner and also be modified in different manners. For example, the rectifier diode D1 may be replaced with a synchronous rectifier switch.

The DC-DC converter 10 generates the drive voltage $V_{OUT}$ between a first line (or an output line) 12 and a second line (or a ground line) 14.

The current drivers 20_1 to 20_N are connected to the light emitting elements 4_1 to 4_N, respectively, in series between the first line 12 and the second line 14. The current drivers 20_1 to 20_N are configured to supply drive currents $I_{LED\_1}$ to $I_{LED\_N}$ to the corresponding light emitting elements 4_1 to 4_N, respectively. The current driver 20 may perform an analog dimming operation that changes an amplitude of the drive current $I_{LED}$ according to target brightness. Alternatively or additionally, the current driver 20 may perform a switch operation of the drive current $I_{LED}$ to perform a PWM (Pulse-Width Modulation) dimming operation that changes an effective lighting time according to a target brightness.

Given i (1≤i≤N), the protection resistor R1_i in the i-th channel is connected to the corresponding light emitting element 4_i in series between the first line 12 and the corresponding current driver 20_i. Specifically, the protection resistor R1_i is interposed between an LED terminal LED_i and a cathode of the LED string 4_i.

The control IC 8 includes a switch (SWOUT) terminal, an OVP terminal, a plurality of LED terminals LED_1 to LED_N, and a ground (GND) terminal. The SWOUT terminal is connected to a control electrode (i.e., a gate electrode) of the switch transistor M1 in the DC-DC converter 10. The LED terminal LED_i in the i-th channel is connected to the cathode of the corresponding LED string 4_i via the corresponding protection resistor R1_i. The GND terminal is connected to the second line 14. The voltage divider 50 generates a second detection voltage $V_{OUT}'$ by dividing the drive voltage $V_{OUT}$ and inputs the generated second detection voltage $V_{OUT}'$ to the OVP terminal.

The current driver 20_i is interposed between the LED terminal LED_i and the GND terminal. The controller 30 controls the DC-DC converter 10 such that a first detection voltage $V_{LED}$, which corresponds to a voltage between both ends of the current driver 20, approaches a predetermined reference voltage $V_{REF}$. In addition, if the drive voltage $V_{OUT}$ applied between the first line 12 and the second line 14 exceeds a predetermined threshold voltage $V_{OVP1}$, the controller 30 is configured to perform a predetermined protection process.

The controller 30 includes an error amplifier 32, a pulse modulator 34, a driver 36, an OVP comparator 38, and a logic part 40.

The error amplifier 32 generates an error voltage $V_{FB}$ by amplifying an error (e.g., a gap in voltage) between the reference voltage $V_{REF}$ and the first detection voltage $V_{LED}$. Specifically, the error amplifier 32 generates an error signal $V_{FB}$ based on an error between the reference voltage $V_{REF}$ and a lowest one among the first detection voltages $V_{LED\_1}$ to $V_{LED\_N}$.

The pulse modulator 34 generates a pulse signal $S_{PM}$ which has a duty cycle depending on the error voltage $V_{FB}$. The pulse modulator 34 is not particularly limited in its modulation schemes and configurations, but may use any suitable or available circuits.

The driver 36 performs a switch operation on the switch element M1 of the DC-DC converter 10 according to the pulse signal $S_{PM}$.

The OVP comparator 38 compares a second detection voltage $V_{OUT}'$ with a second threshold voltage $V_{OVP2}$, and asserts a protection signal OVP when the second detection voltage $V_{OUT}'$ is higher than the second threshold voltage $V_{OVP2}$. The second threshold voltage $V_{OVP2}$ is determined based on a first threshold voltage $V_{OVP1}$ according to following Equation (10):

$$V_{OVP2}=V_{OVP1} \times R12/(R11+R12) \qquad \text{Equation (10)}$$

When the protection signal OVP is asserted, the logic part 40 performs a predetermined protection process. For example, when the OVP signal is asserted, the logic part 40 stops the current drivers 20_1 to 20_N and the switch operation on the DC-DC converter 10.

The configurations of the light emitting device 1 are described in the above. The operations of the light emitting device 1 are described below.

Figure 4:
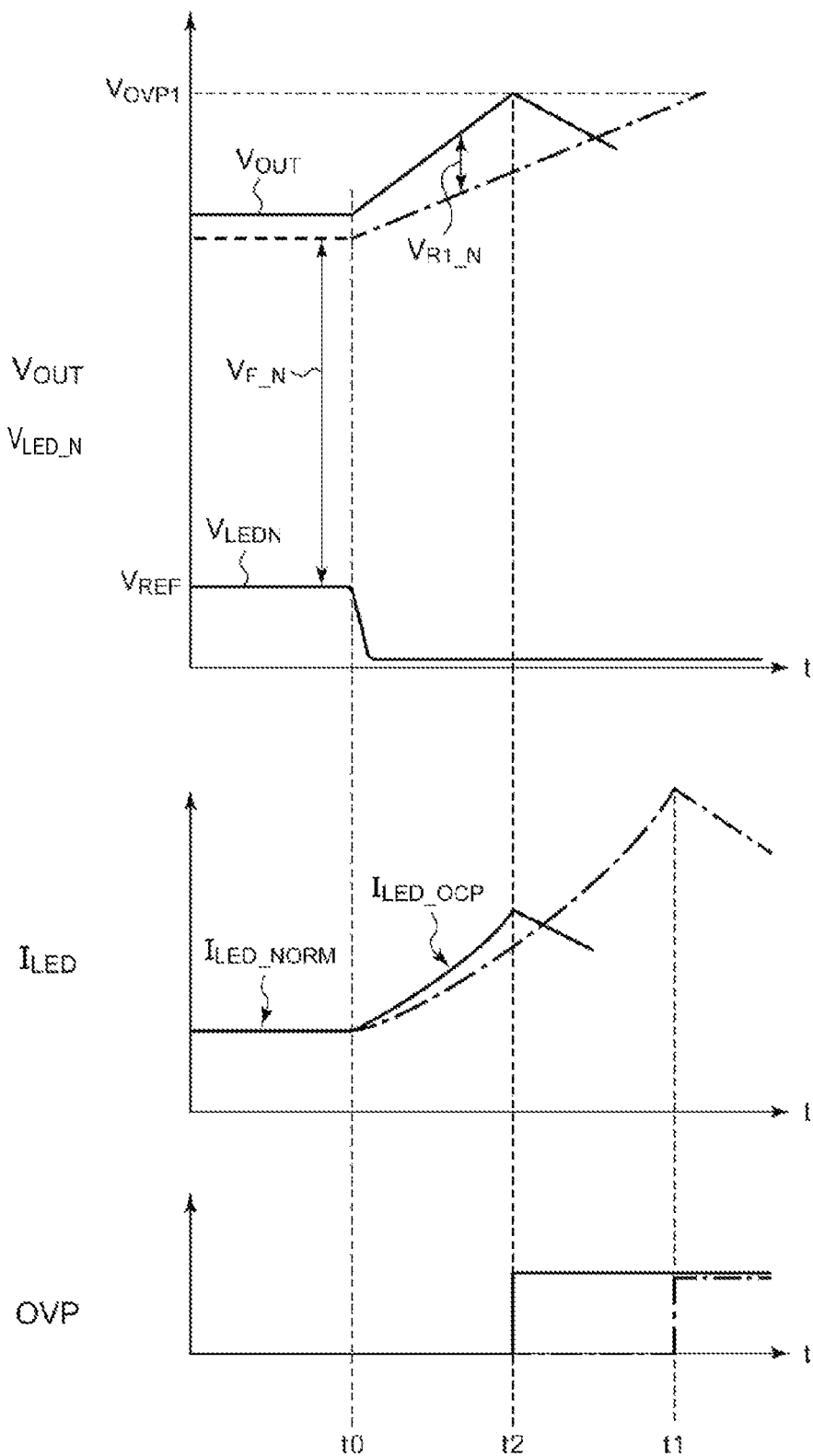
FIG. 4 illustrates diagrams of operation waveforms of the light emitting device illustrated in FIG. 3 under a state of a ground fault.

FIG. 4 illustrates diagrams of operation waveforms of the light emitting device 1 illustrated in FIG. 3 under a state of a ground fault. Before time $t_0$, the light emitting device 1 is in a normal state. The operation waveforms of the conventional light emitting device 1r of FIG. 1 are also illustrated in FIG. 4 for comparison, indicated by dashed lines having dots.

Before time $t_0$, the light emitting device 1 is in a normal state, a cathode voltage $V_{LED\_N}$ of the LED string 4_N in the N-th channel is stabilized to the reference voltage $V_{REF}$, and a drive current $I_{LED\_NORM}$ flows through the LED string 4_N. The drive voltage $V_{OUT}$ is stabilized to a voltage level according to following Equation (11):

$$V_{OUT\_NORM}=V_{F\_NORM}+V_{REF}+V_{R1\_N} \qquad \text{Equation (11)}$$

where $V_{F\_NORM}$ indicates a forward voltage of the LED string 4_N, and VR1_N indicates a voltage drop across the protection resistor R1_N (i.e., $I_{LED\_NORM} \times R1\_N$).

If a ground fault occurs due to a path 6 (as shown in FIG. 1) for example at time $t_0$, the cathode voltage $V_{LED\_N}$ decreases to near 0V. The controller 30 increases the drive voltage $V_{OUT}$ in order to attempt to increase the cathode voltage $V_{LED\_N}$ (at or about 0V) to the reference voltage $V_{REF}$. However, since the cathode voltage $V_{LED\_N}$ is not increased in spite of increasing the drive voltage $V_{OUT}$, a feedback is applied to further increase the drive voltage $V_{OUT}$.

Figure 2:
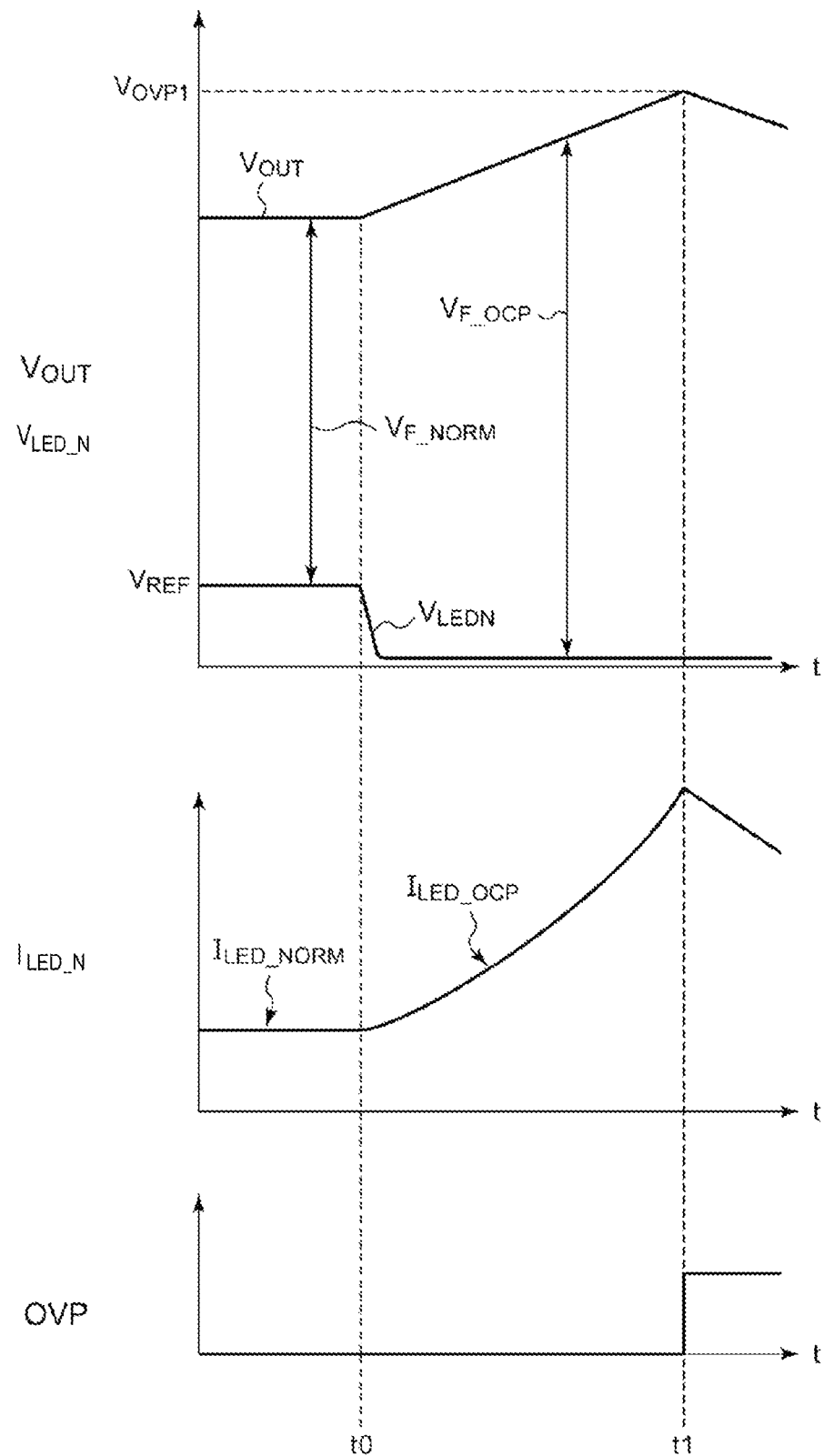
FIG. 2 illustrates diagrams of operation waveforms of the light emitting device illustrated in FIG. 1 under a state of a ground fault.

In this case, since the drive voltage $V_{OUT}$ is directly applied between an anode and a cathode of the LED string 4_N in the N-th channel, the drive current $I_{LED\_N}$ cannot be controlled, which results in increasing the drive current $I_{LED\_N}$. Accordingly, the voltage drop $V_{R1\_N}$ across the protection resistor R1_N increases, and thus, the drive voltage $V_{OUT}$ (indicated by a solid line) increases more rapidly than the previous drive voltage $V_{OUT}$ (indicated by the dashed lines having dots, that is, the drive voltage Vout shown in FIG. 2), as illustrated in FIG. 4.

At time $t_2$, when the drive voltage $V_{OUT}$ reaches the OVP threshold voltage $V_{OVP1}$, the OVP signal is asserted to activate the circuit protection process. Thereafter, the drive voltage $V_{OUT}$ begins to decrease, and thus, the drive current $I_{LED\_N}$ decreases.

As illustrated by the operations of the light emitting device 1 described in the above, the light emitting device 1 in FIG. 3 is capable of reducing the time of an overcurrent flow, because the circuit protection process is applied at time $t_2$, which is earlier than time $t_1$ at which time the overvoltage protection is applied in the light emitting device 1r of FIG. 1.

In addition, the light emitting device 1 of FIG. 3 can further reduce an amount of current flowing during the state of a ground fault, when compared to the light emitting device 1r of FIG. 1, because a voltage applied to the LED string 4_N is decreased by the voltage drop $V_{R1\_N}$ across the protection resistor R1_N for the same drive voltage $V_{OUT}$, as compared to the light emitting device 1r of FIG. 1.

Second Embodiment

Figure 5:
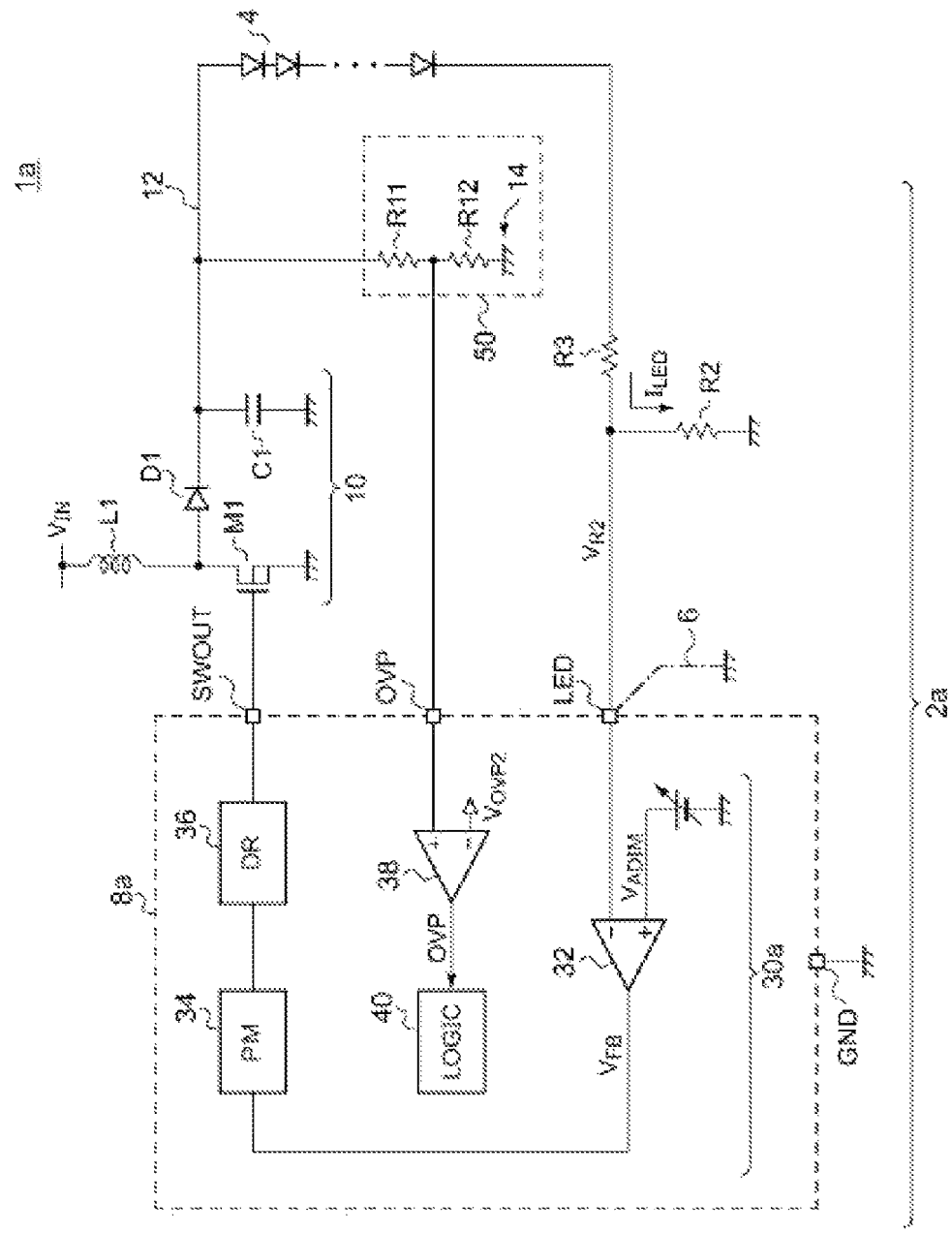
FIG. 5 is a circuit diagram illustrating a light emitting device according to a second embodiment of the present disclosure.

FIG. 5 is a circuit diagram illustrating a light emitting device 1a according to a second embodiment. The light emitting device 1 includes a single LED string 4 and a driving circuit 2a.

The driving circuit 2a includes a DC-DC converter 10, a voltage divider 50, a controller 30a, a detection resistor R2, and a protection resistor R3.

The DC-DC converter 10 generates a drive voltage $V_{OUT}$ between a first line 12 and a second line 14 which corresponds to ground. The detection resistor R2 is connected to the LED string 4 in series between the first line 12 and the second line 14. The protection resistor R3 is connected to the LED string 4 in series between the first line 12 and the detection resistor R2. Specifically, the protection resistor R3 is interposed between an LED terminal and a cathode of the LED string 4.

The controller 30a may be integrated into a control IC 8a. The controller 30a controls the DC-DC converter 10 so as to adjust a third detection voltage $V_{R2}$, which corresponds to a voltage between both ends of the detection resistor R2, to approach a dimming voltage $V_{ADIM}$ that indicates a brightness of the LED string 4. If the drive voltage $V_{OUT}$ between the first line 12 and the second line 14 exceeds a predetermined threshold voltage $V_{OVP1}$, the controller 30a is configured to perform a predetermined protection process.

Similar to the controller 30 illustrated in FIG. 3, the controller 30a includes an error amplifier 32, a pulse modulator 34, a driver 36, an OVP comparator 38, and a logic part 40. The error amplifier 32 generates an error voltage $V_{FB}$ by amplifying an error between the third detection voltage $V_{R2}$ and the dimming voltage $V_{ADIM}$. Other configurations are the same as those of the controller 30 in FIG. 3.

The configurations of the light emitting device 1a are illustrated in the above. The operations of the light emitting device 1a are described in the below.

Figure 6:
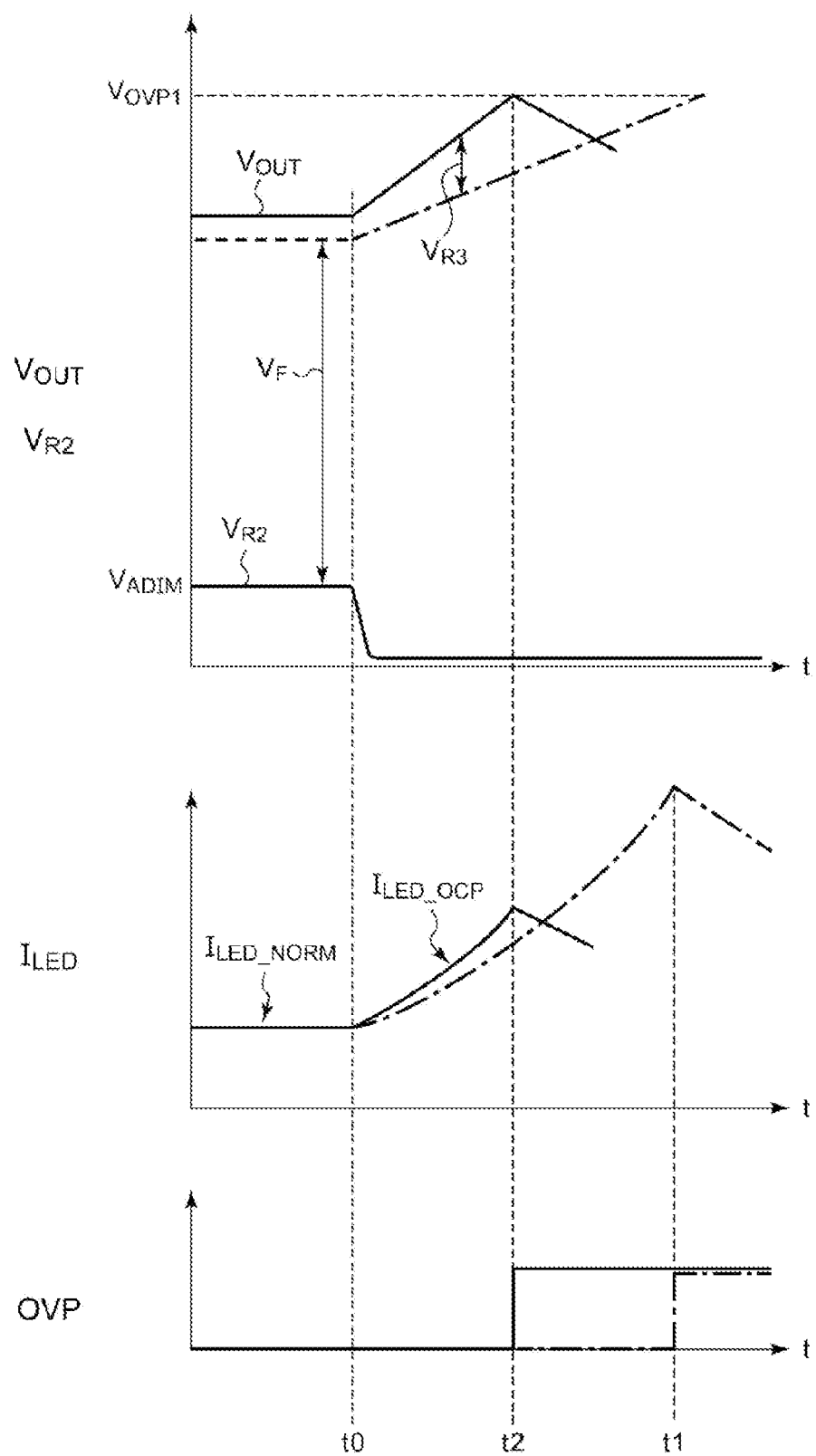
FIG. 6 illustrates diagrams of operation waveforms of the light emitting device illustrated in FIG. 5.

FIG. 6 illustrates diagrams of operation waveforms of the light emitting device 1a illustrated in FIG. 5. In FIG. 6, waveforms of the light emitting device 1a of FIG. 5 are indicated by solid lines while waveforms of a circuit without the protection resistor R3 are indicated by dashed lines having dots.

The operations of the circuit without the protection resistor R3 are first described with reference to the dashed lines having dots.

Before time $t_0$, the circuit is in a normal state and a drive current $I_{LED}$ through the LED string 4 flows into the detection resistor R2. Accordingly, the third detection voltage $V_{R2}$, which corresponds to a voltage drop across the detection resistor R2, is expressed by following Equation (12):

$$V_{R2} = I_{LED} \times R2 \quad \text{Equation (12)}$$

When $V_{R2}$ is equal to $V_{ADIM}$, a feedback control by the controller 30a stabilizes the drive current $I_{LED}$ to an amount of current $I_{LED\_NORM}$ according to following Equation (13):

$$I_{LED\_NORM} = V_{ADIM}/R2 \quad \text{Equation (13)}$$

At time $t_0$, the LED terminal falls in a state of a ground fault due to the path 6. In this case, the third detection voltage $V_{R2}$ decreases to near 0V. The controller 30a increases the drive voltage $V_{OUT}$ in order to increase the third detection voltage $V_{R2}$ of near 0V to the dimming voltage $V_{ADIM}$. However, since the third detection voltage $V_{R2}$ is not increased in spite of increasing the drive voltage $V_{OUT}$, a feedback is applied to further increase the drive voltage $V_{OUT}$.

At this time, since the drive voltage $V_{OUT}$ is directly applied between an anode and a cathode of the LED string 4, the drive current $I_{LED}$ cannot be controlled, which results in increasing the drive current $I_{LED}$. This state lasts until time $t_1$ when the drive voltage $V_{OUT}$ reaches the OVP threshold voltage $V_{OVP1}$. After time $t_1$, as the OVP is activated, the drive voltage $V_{OUT}$ begins to decrease, and thus, the drive current $I_{LED}$ decreases.

The operations of the light emitting device 1a in FIG. 5 are described below with reference to the solid lines. Before time $t_0$, the drive voltage $V_{OUT}$ is stabilized to a voltage level according to following Equation (14):

$$V_{OUT\_NORM} = V_{ADIM} + V_F + V_{R3} = V_{ADIM} + V_F + I_{LED\_NORM} \times R3 \quad \text{Equation (14)}$$

At time $t_0$, the LED terminal falls in a state of a ground fault due to the path 6. At this time, the third detection voltage $V_{R2}$ decreases to near 0V. The controller 30a increases the drive voltage $V_{OUT}$ in order to attempt to increase the third detection voltage $V_{R2}$ (at or near 0V) to the dimming voltage $V_{ADIM}$. However, since the third detection voltage $V_{R2}$ is not increased in spite of increasing the drive voltage $V_{OUT}$, a feedback is applied to further increase the drive voltage $V_{OUT}$.

At this time, since the drive voltage $V_{OUT}$ is directly applied between the anode and the cathode of the LED string 4, the drive current $I_{LED}$ cannot be controlled, which results in increasing the drive current $I_{LED}$. Thus, since the voltage drop $V_{R3}$ across the protection resistor R3 is increased, the drive voltage $V_{OUT}$ increases more rapidly than the drive voltage $V_{OUT}$ indicated by the dashed lines having dots.

Then, at time $t_2$, when the drive voltage $V_{OUT}$ reaches the OVP threshold voltage $V_{OVP1}$, the OVP signal is asserted to activate the circuit protection. Thereafter, the drive voltage $V_{OUT}$ begins to decrease, and thus, the drive current $I_{LED\_N}$ decreases.

As illustrated in the operation of the light emitting device 1a of FIG. 5, the time period of an overcurrent flow can be reduced, because the circuit protection is applied at time $t_2$ earlier than time $t_1$ at which the overvoltage protection is applied in the absence of the protection resistor R3.

In addition, the light emitting device 1a of FIG. 5 can further reduce an amount of current flowing in the state of a ground fault, when compared to the case without the protection resistor R3, because a voltage applied to the LED string 4 is decreased by the voltage drop $V_{R3}$ across the protection resistor R3.

Figure 7:
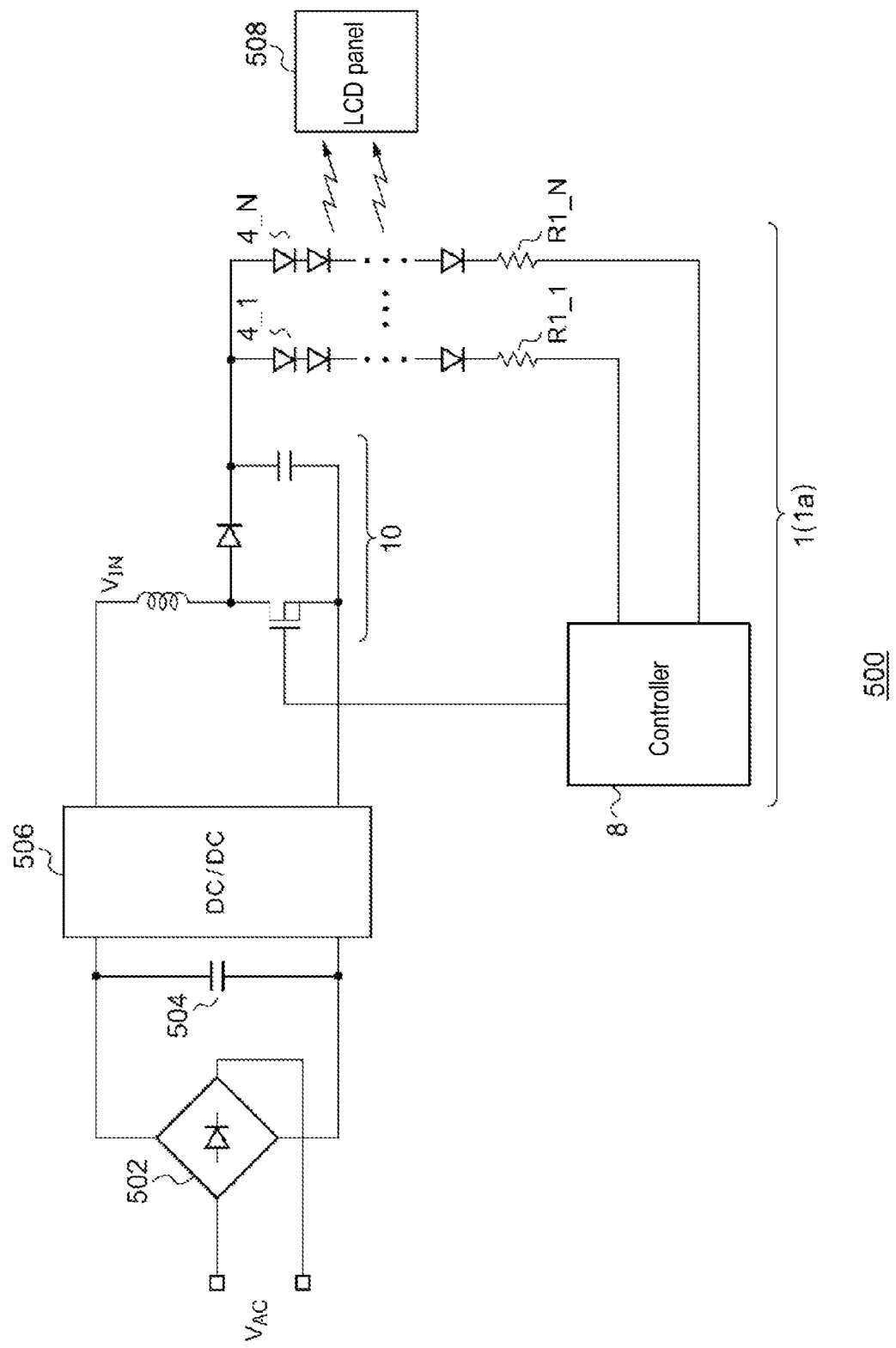
FIG. 7 is a circuit diagram illustrating a configuration of an electronic apparatus that includes a light emitting device, according to some embodiments.

FIG. 7 is a circuit diagram illustrating a configuration of an electronic apparatus 500 that includes the light emitting device 1 (or 1a). The electronic apparatus 500 is an apparatus that operates with power from a commercial AC power source, such as a notebook computer, a display apparatus, a television receiver, etc.

The electronic apparatus 500 includes a rectifier circuit 502, a smoothing capacitor 504, a DC-DC converter 506, and a LCD panel 508, in addition to the light emitting device 1 (or 1a). The light emitting device 1 is used as a backlight unit for the LCD panel 508.

The rectifier circuit 502 rectifies a commercial AC voltage $V_{AC}$. The smoothing capacitor 504 generates a DC voltage $V_{DC}$ by smoothing the rectified voltage. The DC-DC converter 506 lowers the DC voltage $V_{DC}$. The light emitting device 1 (or 1a) operates with a DC voltage $V_{IN}$ from the DC-DC converter 506.

Figure 8:
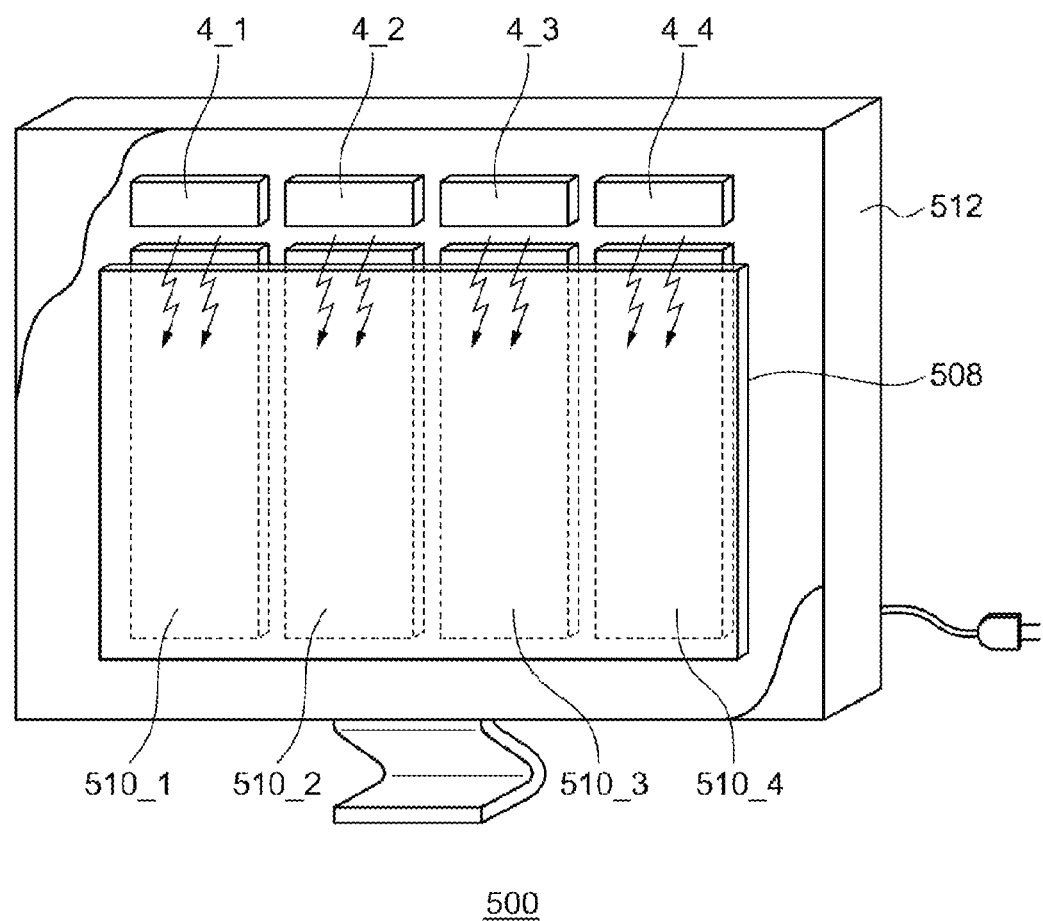
FIG. 8 is a perspective view illustrating the electronic apparatus illustrated in FIG. 7.

FIG. 8 is a perspective view illustrating the electronic apparatus 500 of FIG. 7. The electronic apparatus 500 of FIG. 8 is an edge-light type display apparatus. A plurality of light guide plates 510_1 to 510_N is disposed on a rear side of the LCD panel 508. Four LED strings 4_1 to 4_4 in four channels are arranged to irradiate the corresponding light guide plates 510_1 to 510_N. Although not shown in FIG. 8, the rectifier circuit 502, the smoothing capacitor 504, the DC-DC converter 506, the control IC 8, and so on illustrated in FIG. 7 are incorporated in a housing 512 of the electronic apparatus 500.

The present disclosure has been illustrated with the above particular embodiments. These embodiments are merely illustrative and their components and processes and combinations thereof may be modified in different manners. Some of such modifications are described below.

An order of the LED strings 4, the current drivers 20, and the protection resistors R1 according to the first embodiment is not limited to that illustrated in FIG. 3. For example, the protection resistor R1_i may be interposed between the first line 12 and the LED string 4_i. In addition, although this embodiment describes that the current drivers 20 are provided to the cathode side of the LED strings 4 and absorb the drive current (i.e., a sink-type), the current drivers 20 may be provided at the anode side of the LED strings 4 and discharge the drive current (i.e., a source-type).

In addition, an order of the LED string 4, the detection resistor R2, and the protection resistor R3 according to the second embodiment is not limited to that illustrated in FIG. 5. For example, the protection resistor R3 may be interposed between the first line 12 and the LED string 4.

A backlight unit that employs the light emitting device 1 may be either of (i) an edge-light type described in the above embodiments or (ii) a direct type in which the LED strings 4 are disposed on the rear side of the LCD panel 508.

Although the non-insulation type DC-DC converter that uses an inductor is described in the above embodiments, the present disclosure may be implemented with any suitable insulation type DC-DC converter using a transformer.

Although an electronic apparatus is described as an application of the light emitting device 3 in the above embodiments, the light emitting device 3 is not particularly limited in its usage but may be used for illuminators, electric bulletin boards, electronic signboards, and so on.

In addition, in the above embodiments, setting signals to high and low level logic signals is merely illustrative and such logic signals may be freely changed by being properly inverted by an inverter or the like.

According to the present disclosure, a circuit can be protected from an overcurrent state.

While certain embodiments have been described, these embodiments have been presented by way of example only, and are not intended to limit the scope of the disclosure. Indeed, the novel methods and apparatuses described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A driving circuit for a light emitting element, comprising:
   a DC-DC converter configured to generate a drive voltage between a first line and a second line;
   a current driver, configured to be connected to the light emitting element in series between the first line and the second line, configured to supply a drive current to the light emitting element;
   a protection resistor configured to be connected to the light emitting element in series between the first line and the current driver; and
   a controller configured to control the DC-DC converter such that a first detection voltage, which corresponds to a voltage between both ends of the current driver, approaches a predetermined reference voltage, and perform a predetermined protection process if the drive voltage between the first line and the second line exceeds a predetermined first threshold voltage.

2. The driving circuit of claim 1, further comprising a voltage divider configured to generate a second detection voltage by dividing the drive voltage,
   wherein the controller includes:
      an error amplifier configured to generate an error signal by amplifying an error between the first detection voltage and the reference voltage;
      a pulse modulator configured to generate a pulse signal having a duty cycle associated with the error signal;
      a driver configured to perform a switch operation on a switch element of the DC-DC converter based on the pulse signal;
      a comparator configured to compare the second detection voltage with a second threshold voltage and assert a protection signal if the second detection voltage is higher than the second threshold voltage, the second threshold voltage being determined based on the first threshold voltage; and
      a logic part configured to perform the predetermined protection process if the protection signal is asserted.

3. The driving circuit of claim 1, wherein the light emitting element and the current driver are provided in each of a plurality of channels, and
   wherein the controller is further configured to control the DC-DC converter such that a lowest one of the first detection voltages in the plurality of channels approaches the reference voltage.

4. The driving circuit of claim 1, wherein the light emitting element is a light emitting diode string including a plurality of light emitting diodes connected in series.

5. The driving circuit of claim 1, wherein the current driver and the controller are integrated into a single semiconductor substrate.

6. A light emitting device comprising:
   a light emitting element; and
   the driving circuit of claim 1,
   wherein the driving circuit drives the light emitting element.

7. An electronic apparatus, comprising:
   a liquid crystal display panel; and
   the light emitting device of claim 6,
   wherein the light emitting device is provided as a backlight unit for the liquid crystal display panel.

8. A driving circuit for a light emitting element, comprising:
   a DC-DC converter configured to generate a drive voltage between a first line and a second line;
   a detection resistor configured to be connected to the light emitting element in series between the first line and the second line;
   a protection resistor configured to be connected to the light emitting element in series between the first line and the detection resistor; and
   a controller configured to control the DC-DC converter such that a first detection voltage, which corresponds to a voltage between both ends of the detection resistor, approaches a dimming voltage indicative of brightness of the light emitting element, and perform a predetermined protection process if the drive voltage between the first line and the second line exceeds a predetermined first threshold voltage.

9. The driving circuit of claim 8, further comprising a voltage divider configured to generate a second detection voltage by dividing the drive voltage, wherein the controller includes:
- an error amplifier configured to generate an error signal by amplifying an error between the first detection voltage and the dimming voltage;
- a pulse modulator configured to generate a pulse signal having a duty cycle associated with the error signal;
- a driver configured to perform a switch operation on a switch element of the DC-DC converter based on the pulse signal;
- a comparator configured to compare the second detection voltage with a second threshold voltage and assert a protection signal if the second detection voltage is higher than the second threshold voltage, the second threshold voltage being determined based on the first threshold voltage; and
- a logic part configured to perform the predetermined protection process if the protection signal is asserted.

10. The driving circuit of claim 8, wherein the light emitting element is a light emitting diode string including a plurality of light emitting diodes connected in series.

11. The driving circuit of claim 8, wherein the controller is integrated into a single semiconductor substrate.

12. A light emitting device comprising:
a light emitting element; and
the driving circuit of claim 8,
wherein the driving circuit drives the light emitting element.

13. An electronic apparatus comprising:
a liquid crystal display panel; and
the light emitting device of claim 12,
wherein the light emitting device is provided as a backlight unit for the liquid crystal display panel.

* * * * *